(12) United States Patent
Stacey (10) Patent No.: US 9,223,792 B1
(45) Date of Patent: Dec. 29, 2015

(54) AUGMENTING METADATA COLLECTION FOR STORED DATA ANALYTICS

(71) Applicant: EMC Corporation, Hopkinton, MA (US)

(72) Inventor: Christopher Stacey, Opawa (NZ)

(73) Assignee: EMC CORPORATION, Hopkinton, MA (US)

( * ) Notice: Subject to any disclaimer, the term of this patent is extended or adjusted under 35 U.S.C. 154(b) by 230 days.

(21) Appl. No.: 14/030,470

(22) Filed: Sep. 18, 2013

(51) Int. Cl.
G06F 7/00 (2006.01)
G06F 17/30 (2006.01)

(52) U.S. Cl.
CPC ...... *G06F 17/3012* (2013.01); *G06F 17/30997* (2013.01)

(58) Field of Classification Search
None
See application file for complete search history.

(56) References Cited

U.S. PATENT DOCUMENTS

| | | | |
|---|---|---|---|
| 2009/0216719 A1* | 8/2009 | Coffman et al. | 707/3 |
| 2010/0199350 A1* | 8/2010 | Lilibridge et al. | 726/24 |
| 2010/0235376 A1* | 9/2010 | Sukanen et al. | 707/769 |
| 2010/0275180 A1* | 10/2010 | Alex | 717/106 |
| 2011/0040800 A1* | 2/2011 | Karibe | 707/802 |
| 2011/0161327 A1* | 6/2011 | Pawar | 707/741 |

* cited by examiner

*Primary Examiner* — Uyen Le
(74) *Attorney, Agent, or Firm* — Sean Evans; Jason A. Reyes; Krishnendu Gupta (57) ABSTRACT

Implementations are provided herein relating to augmenting metadata collection within a storage platform. The storage platform can be audited to determine the types of metadata currently being gathered within the storage platform, and the schedule for when that information is gathered. The storage platform can receive a request to generate metadata, compare the requested information with the previously generated and/or scheduled generation of metadata. Rather than redundantly gathering the same metadata via multiple requests, known metadata or scheduled retrieval of known metadata can be used to process portions of the metadata request, and any metadata that was not previously generated can then be separately generated. In this sense, the metadata collection within a storage platform can be augmented to gather additional metadata requested outside the storage platform in an efficient matter that does not unnecessarily increase scanning activity within the storage platform.

20 Claims, 8 Drawing Sheets

AUGMENTING METADATA COLLECTION FOR STORED DATA ANALYTICS

FIELD OF THE INVENTION

This invention relates generally to processing stored data, and more particularly to systems and methods for providing analytics data associated with the storage of data.

BACKGROUND OF THE INVENTION

Computer systems not only store data to be accessed both locally and through a network but they are also capable of performing a wide variety of analytics relating to the data stored within the system. Analytics software suites can process raw network data to provide valuable information to network administrators or other interested parties related to network usage, network efficiencies, network bottlenecks, network capacity, etc. Through analytics, administrators and companies can more effectively manage existing computer system infrastructure while also more accurately planning for future needs.

In a data storage platform with multiple storage devices, performing analytics on the entire data store requires gathering information, such as metadata, from each node or storage device. For example, one approach to gathering stored data metadata is by scanning the storage platform from outside the storage platform using standard client access network protocols such as Network File System ("NFS") and Common Internet File System ("CIFS") protocols in a NAS file storage context and SCSI in a block storage context. However, using network protocols such as NFS and CIFS to request metadata from a storage platform by an external client can limit the metadata that can be gathered to metadata that can be expressed in the standard protocols. In addition, in some instances, the use of the network protocols in gathering metadata can negatively impact the performance of the data servers and/or storage platforms on which the metadata is being gathered. It can also increase network traffic, for example, by tree walking all network attached storage devices.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a receiving component can receive a request to gather a set of requested metadata from a network device. A metadata identification component can determine a set of schedule generated metadata and a set of unknown metadata based on the set of requested metadata. A scanning component can scan a data server for the set of unknown metadata associated with at least one of a set of files or a set of data blocks or a set of data objects and generate the set of unknown metadata based on the scanning. A metadata collection optimization component can generate a set of responsive metadata based on the generated set of unknown metadata and the set of schedule generated metadata. An output component can send the set of responsive metadata to the network device.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter can be practiced without these specific details. In other instances, well-known structures and devices are shown in block diagram form in order to facilitate describing the claimed subject matter.

In a storage platform, performing analytics on the data contained in the entire data store requires gathering information, such as metadata, from each node or storage device. Problems can occur in managing such a process, as storage devices within the system as a whole may be made by different vendors, have differing storage formats, use differing network communication protocols, etc. Standardized protocols such as the Network File System ("NFS") and Common Internet File System ("CIFS") protocols can be used to alleviate some of these issues by providing a common language for the exchange of data between network devices. However, using network client data access protocols to request metadata from a data server by an external client can limit the metadata that can be gathered to metadata that can be expressed in the protocols used (e.g. NFS, CIFS and SCSI) protocols. In addition, the use of network client data access protocols in gathering metadata can limit the performance of the systems on which the metadata is being gathered.

Implementations disclosed herein provide for gathering metadata about the data stored by a storage platform from within the storage platform itself. The storage platform can be audited to determine the types of metadata currently being gathered within the storage platform, and the schedule for when that information is gathered. The storage platform can receive a request to generate metadata about the stored data, compare the requested information with the previously generated and/or scheduled generation of metadata. Rather than redundantly gathering the same metadata via multiple requests, known metadata or scheduled retrieval of known metadata can be used to process portions of the metadata request, and any metadata that was not previously generated or scheduled to be generated in the future can then be separately generated. In this sense, the metadata collection within a storage platform can be augmented to gather additional metadata requested from outside the storage platform in an efficient manner that does not unnecessarily increase scanning activity within the storage platform.

Figure 1:
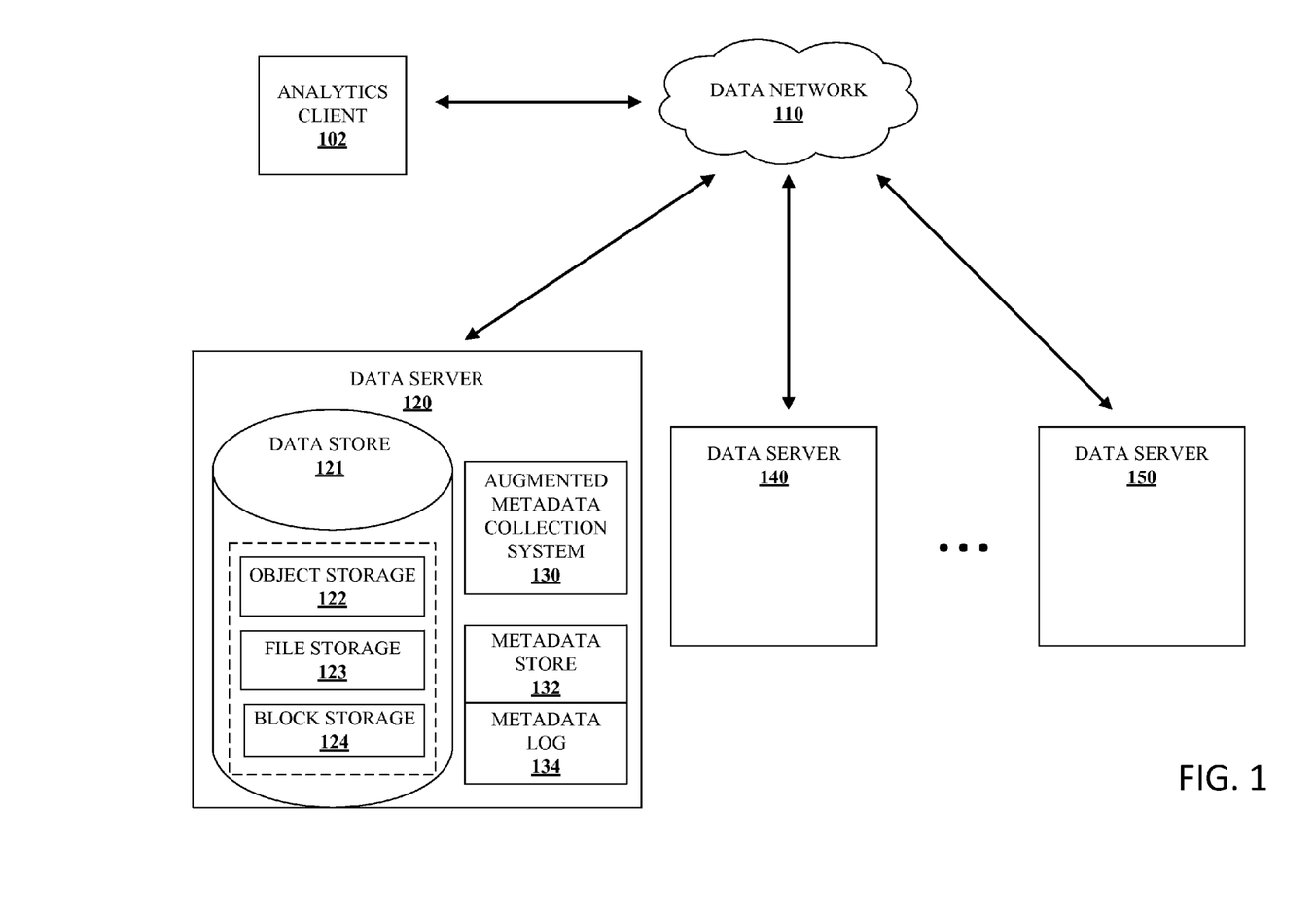
FIG. 1 illustrates an example block diagram of a set of networked data servers and an analytics client in accordance with implementations of this disclosure.

Referring now to FIG. 1, there is illustrated an example block diagram of a set of networked data servers and an analytics client in accordance with implementations of this disclosure. An analytics client 102 can be present to, for example, provide analytics data related to Data Servers 120, 140, 150, etc. It can be appreciated that the implementations disclosed herein are not limited by the number of storage devices attached to data network 110. It can be further appreciated that storage devices attached to data network 110 are not limited by communication protocols, storage environment, physical location, etc.

Based on an analytics request made by a user of analytics client 102 or a request made as a part of an automated analytics data gathering process, analytics client 102 can make calls to data server 120, 140, and 150, through data network 110, and request metadata. Metadata can be related to data age, data usage, data usage over time, data authors, stub identification, stub pointers, stub authentication, stub fingerprints, stub size, lock presence, lock timing, etc. For example, a stub can be a data object that acts as a placeholder for data that has been moved to storage outside the storage platform. It will include a pointer to the data and also includes all metadata related to the data that has been moved. It can be appreciated that stubs are used when data is moved to external platform storage or other storage areas that may be cheaper or more efficient for continued use of the data. It can be appreciated that any metadata produced by the storage platform can be collected within the storage platform and is not limited to the metadata that can be expressed in standardized data access protocols such as CIFS or NFS or SCSI. It can be appreciated that external client access to a storage platform using standard network protocols will be subject to security controls inherent to the protocol used or specifically associated with metadata requests. By collecting metadata within the storage platform, bypass mechanisms are not needed for individual metadata requests made within data servers 120, 140, 150, etc.

Augmented metadata collection system 130 can receive the metadata request, process the metadata request, and return the results to analytics client 102. As a part of processing the request, augmented metadata collection system can efficiently schedule metadata scanning based on existing scheduled metadata collection. For example, augmented metadata collection system 130 can be in communication with metadata store 132 and metadata log 134 to identify metadata that is currently being generated. In one implementation, augmented metadata collection system 130 can examine the metadata log to determine what types of metadata are gathered on a recurring basis due to other activity on the storage platform. If portions of the set of requested metadata overlap with recurring scheduled metadata, the overlapping portion can be identified as schedule generated metadata and the remaining portion of the set of requested metadata that does not overlap can be identified as unknown metadata. The set of schedule generated metadata can be returned at a time based on the scheduled scan. The set of unknown metadata can then be scanned separately. It can be appreciated that by not scanning the data server 120 twice for the same schedule generated metadata, data server 120 scanning activity can be reduced.

In some implementations, augmented metadata collection system can determine whether scheduled metadata scans have been altered by administrators or users to remove metadata retrieval options. For example, an administrator of data server 120 may remove retrieval of metadata from portions of the namespace. Augmented metadata collection system can determine what is currently collected and augment that collection, even including functionality previously removed by a user or an administrator.

Data store 121 can be scanned by augmented metadata collection 130 for metadata related to object storage 122, file storage 123, and block storage 124. As described in greater detail with respect to FIG. 8, data server 120 can include multiple differing storage types of storage including object storage, block storage, file storage, snapshot storage, mirrored storage, metadata storage, etc.

In some implementations, the schedule generated metadata can be filtered based on the unknown metadata. For example, metadata associated with the location and file size of all files within data server 120 may already be generated as scheduled metadata. Continuing the example, analytics client 102 then requests the location and file size for all files that have been accessed at least twice in the last 2 months within data server 120. Augmented metadata collection system 130 can identify that it has already scheduled collection of metadata associated with the location and file size of all files within data server 120, then identify a subset of all the files that have been accessed at least twice in the last months, and filter the list of schedule generated metadata to retain metadata associated with the location and file size of just those files that are a part of both sets, and return the result to analytics client 102. In this sense, the unknown information gathered by augmented metadata collection system 130 can be used to filter metadata collected on schedule.

In some implementations, the filtering of the metadata can occur within analytics client 102. It can be appreciated that by filtering results within data server 120, network traffic can be reduced by sending a filtered set of metadata via data network 110 to analytics client 102. It can be further appreciated that metadata related to data access activity, data migration, tiering, protection operations, etc. is in general not just passive information that is waiting to be retrieved by, for example, analytics client 102.

In some implementations, augmented metadata collection system 130 can schedule the additional scanning of data server 120 related to previously unknown or unscheduled metadata to occur contemporaneously with ongoing scanning or to augment scheduled scanning to scan for the additional requested metadata.

Figure 2:
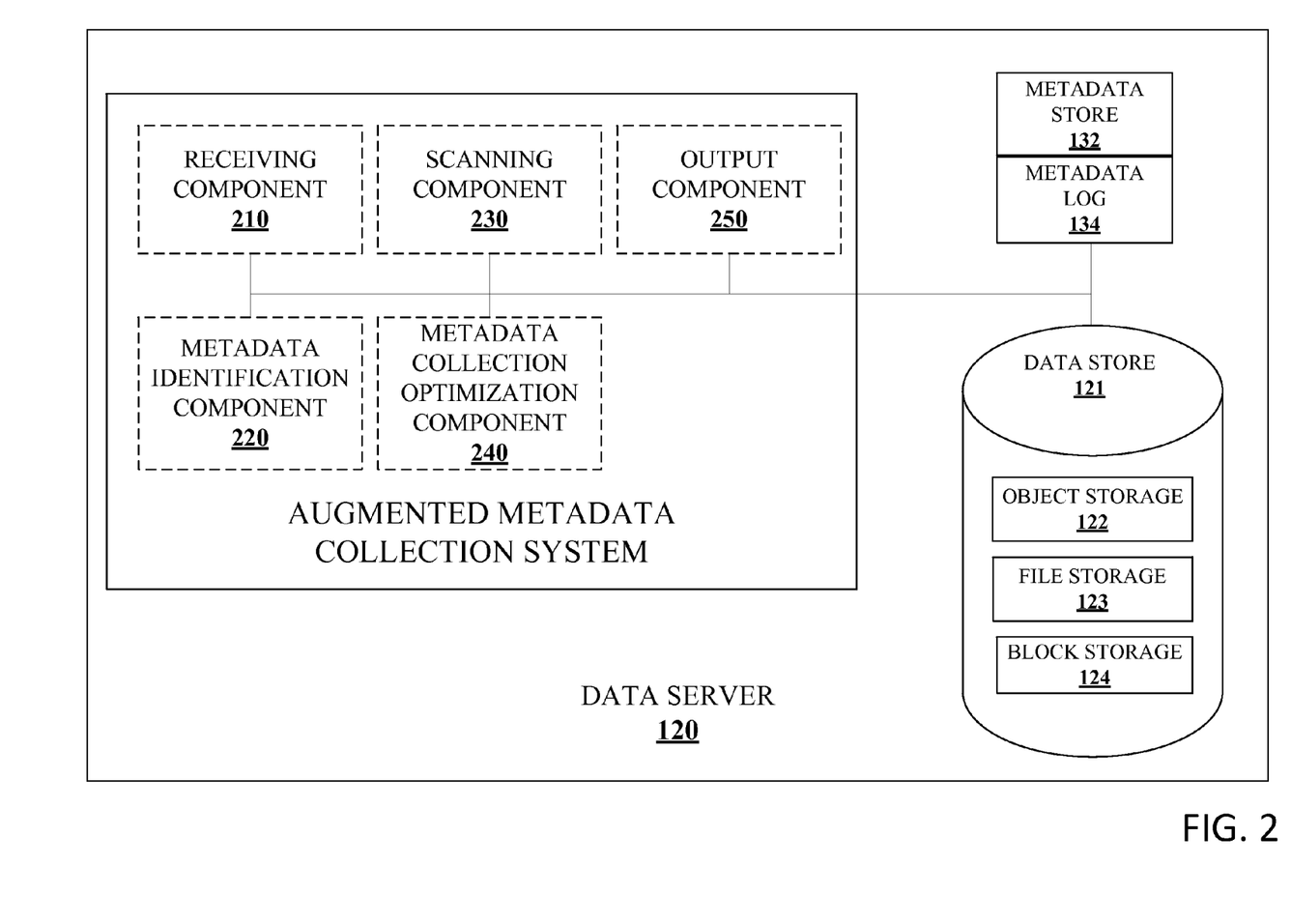
FIG. 2 illustrates a high-level functional block diagram of an example augmented metadata collection system in accordance with implementations of this disclosure.

Referring now to FIG. 2, there is illustrated a high-level functional block diagram of an example augmented metadata collection system in accordance with implementations of this disclosure. Receiving component 210 can receive a request to gather a set of requested metadata from a network device. For example, receiving component 210 can receive a request to gather data access activity data relating to how often individual data objects (files, blocks, objects, snapshots, etc.) are accessed, who is accessing the data object, and then also limit the selections to a range of access dates. In addition, requested metadata can include the age of a data object, the size of a data object, the type of the data object, changes over time, stub metadata, etc. It can be appreciated that the types of metadata that can be requested are only limited by the storage platform's ability to collect the metadata. It can further appreciated that the types of metadata that can be requested are not limited to those that can be exchanged over certain network protocols. Receiving component 210 can receive requests outside of standard network protocols such as CIFS, NFS and SCSI.

In some implementations, security protocols can be established between receiving component 210 and the device that sent the request to gather the set of requested metadata. It can be appreciated that by securely validating the request, additional security during the scanning and metadata identification as described in greater detail below do not require additional security layer access.

Metadata identification component 220 can determine a set of schedule generated metadata and a set of unknown metadata based on the set of requested metadata. In one implementation, metadata identification component 220 can determine these set of schedule generated metadata based on a set of metadata collection history. For example, metadata identification component 220 can exchange data with a metadata store 132 and metadata log 134 that may be internal to data server 120. Metadata store can include a store of all metadata actively maintained by data server 120. It can be appreciated that some metadata requested by outside clients may not be actively maintained by data server 120 and instead must be generated by scanning data store 121. Metadata Log 134 can include a scan history of past metadata scans, scan activity diagnostics, the identity of outside clients that requested scanning activity, etc. In one implementation, metadata identification component 220 can examine the metadata log 134 and metadata store 132 to determine what types of metadata are actively stored and/or generated via scanning on a recurring basis. If portions of the set of requested metadata overlap with recurring scheduled metadata, the overlapping portion can be identified as schedule generated metadata and the remaining portion of the set of requested metadata that does not overlap can be identified as unknown metadata.

Scanning component 230 can scan a data server for the set of unknown metadata associated with at least one of a set of files or a set of data blocks and generates the set of unknown metadata based on the scanning. It can be appreciated that since scanning the data server for metadata is internal to the storage platform, security protocols are not necessary between scanning component 230 and any other component, storage device, or disk array or data server 120.

Metadata collection optimization component 240 can generate a set of responsive metadata based on the generated set of unknown metadata and the set of schedule generated metadata. In one implementation, metadata collection optimization component can filter the set of schedule generated metadata based on the set of unknown metadata. Output component 250 can send the set of responsive metadata to the network device. For example, output component 250 can send the set of responsive metadata to an analytics client.

Figure 3:
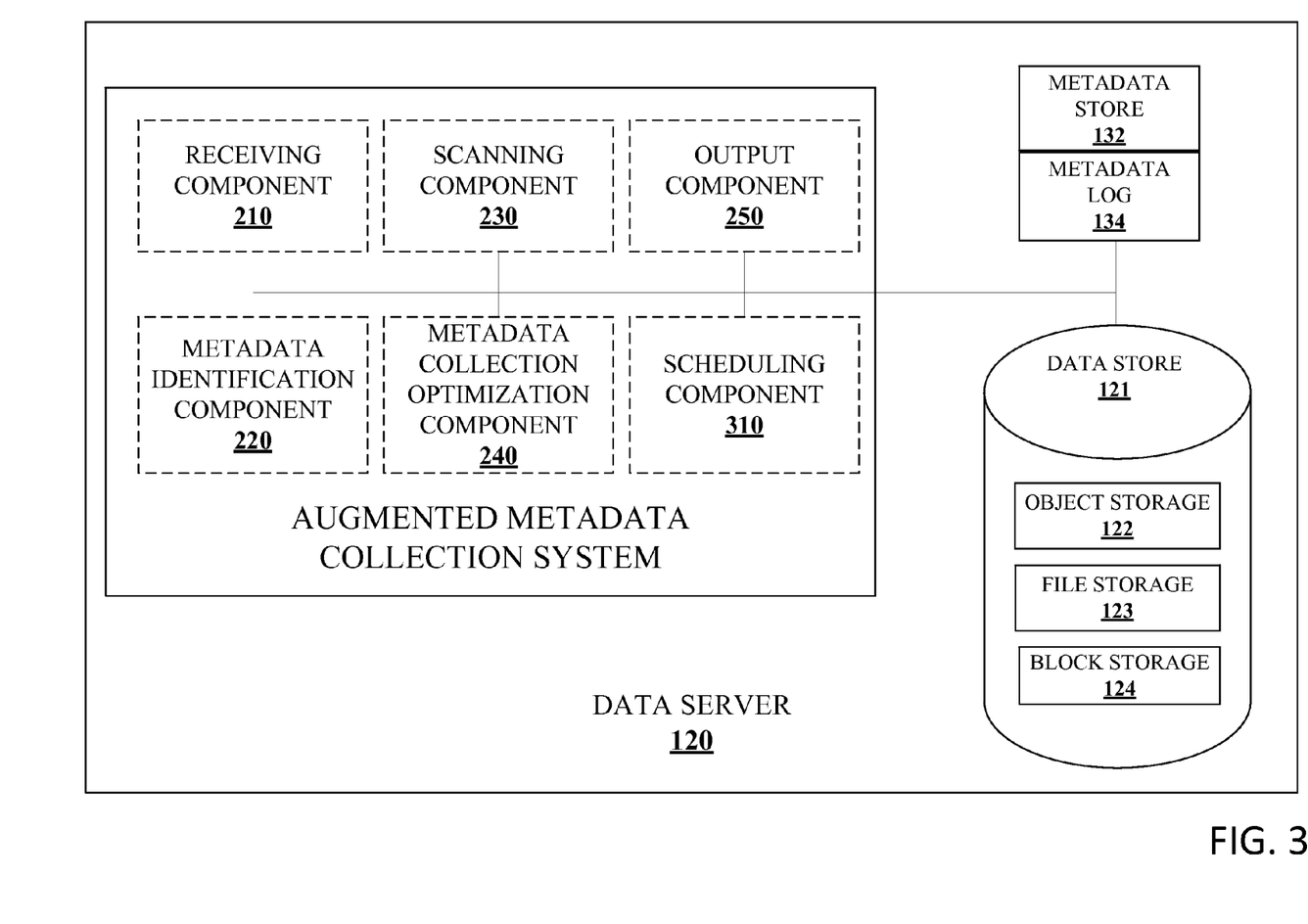
FIG. 3 illustrates a high-level functional block diagram of an example augmented metadata collection system including a scheduling component in accordance with implementations of this disclosure.

FIG. 3 illustrates a high-level functional block diagram of an example augmented metadata collection system including a scheduling component 310 in accordance with implementations of this disclosure. Scheduling component 310 can generate a scanning schedule based on the set of metadata collection history wherein the scanning component can scan the data server based on the scanning schedule. For example, scheduling component can optimize the timing of scanning component 230 to scan at times of low activity, scan in conjunction with other scans, etc. In one implementation, scheduling component 310 generates the scanning schedule based on minimizing independent metadata scans.

In one implementation, scheduling component 310 can determine a sending schedule based on the scanning schedule wherein the output component 250 sends the set of responsive metadata based on the sending schedule. For example, scheduling component can optimize the timing of output component 230 to send responsive metadata at times of low activity, in conjunction with scans, etc.

FIGS. 4-7 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

Figure 4:
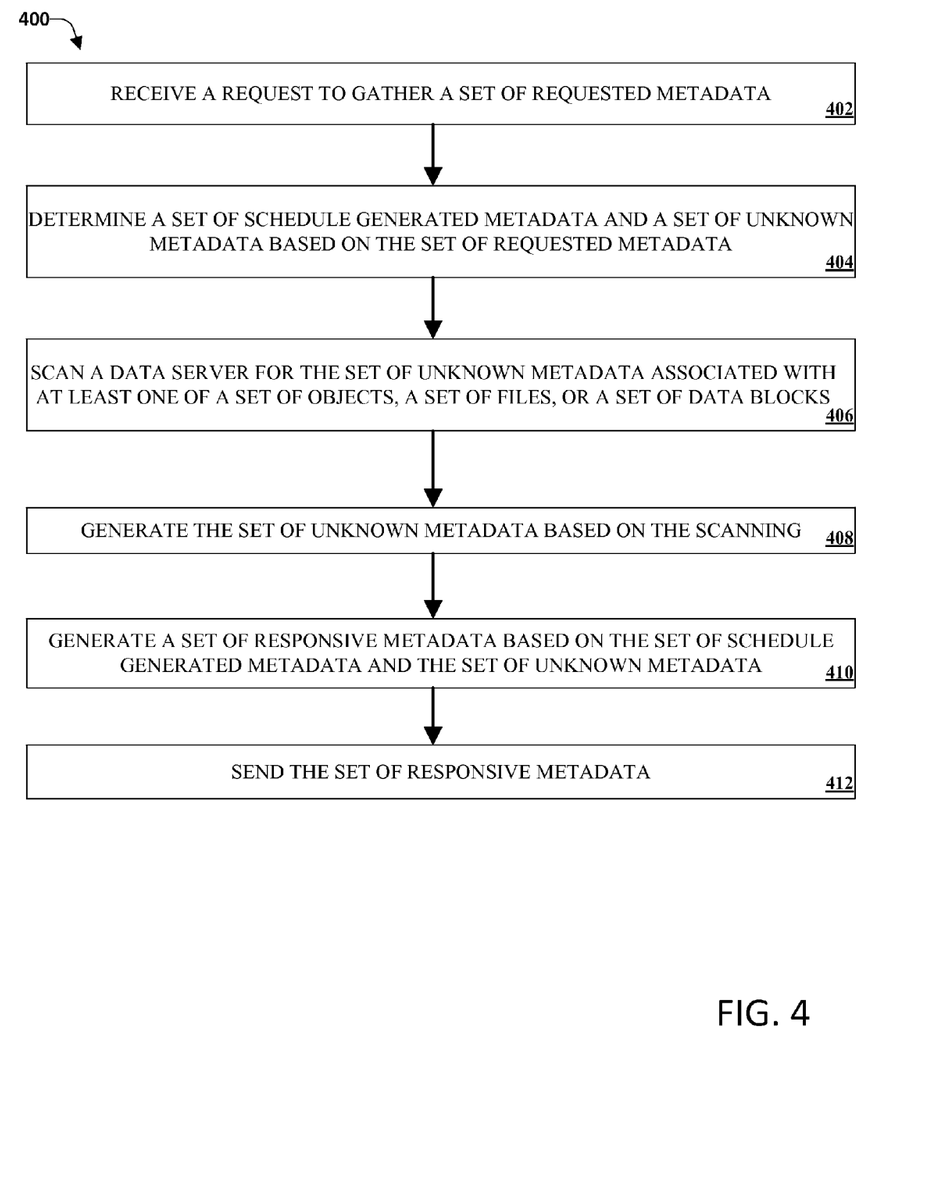
FIG. 4 illustrates an example method for augmenting metadata collection in accordance with implementations of this disclosure.

FIG. 4 illustrates an example method for augmenting metadata collection in accordance with implementations of this disclosure. At 402, a request to gather a set of requested metadata can be received (e.g., by a receiving component 210). At 404, a set of schedule generated metadata and a set of unknown metadata can be determined (e.g., by a metadata identification component 220) based on the set of requested metadata. In one implementation, the set of unknown metadata can include data activity metadata. In one implementation, the data activity metadata includes at least a last modified date and an activity over time metric. In one implementation, the set of unknown metadata can include stub object metadata. In one implementation, stub object metadata can include at least one of stub object data location, stub object authentication data, stub object data fingerprints, stub object data size. In one implementation, the set of unknown metadata includes data lock metadata.

At 406, a data server can be scanned (e.g., by a scanning component 230) for the set of unknown metadata associated with at least one of a set of objects, files or a set of data blocks. At 408, the set of unknown metadata can be generated (e.g., by a scanning component 230) based on the scanning. In one implementation, the generating the set of responsive metadata occurs without regenerating the set of schedule generated metadata. At 410, a set of responsive metadata can be generated (e.g., by metadata collection optimization component 240) based on the set of schedule generated metadata and the set of unknown metadata. At 412, the set of responsive metadata can be sent (e.g., by output component 250).

Figure 5:
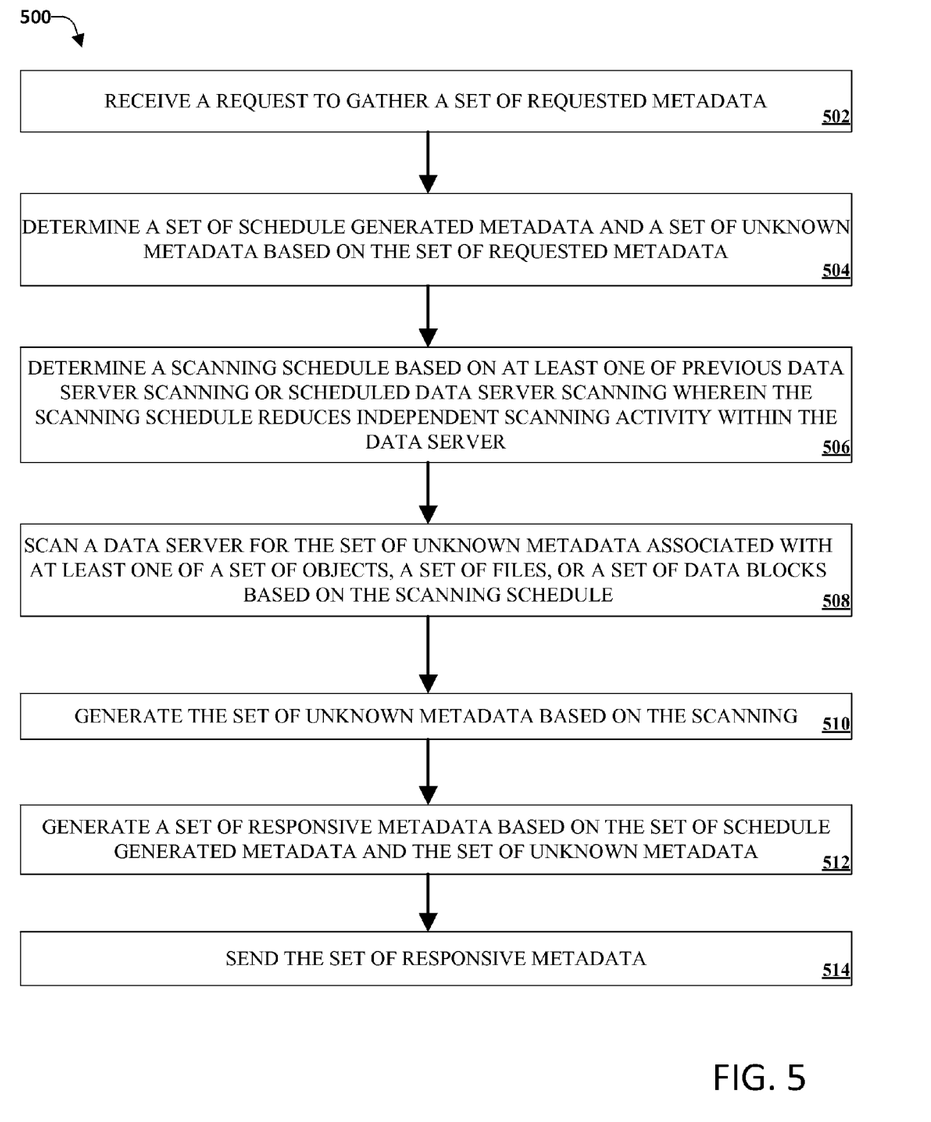
FIG. 5 illustrates an example method for augmenting metadata collection including determining a scanning schedule in accordance with implementations of this disclosure.

FIG. 5 illustrates an example method for augmenting metadata collection including determining a scanning schedule in accordance with implementations of this disclosure. At 502, a request to gather a set of requested metadata can be received (e.g., by a receiving component 210). At 504, a set of schedule generated metadata and a set of unknown metadata can be determined (e.g., by a metadata identification component 220) based on the set of requested metadata. At 506, a scanning schedule can be determined (e.g., by a scheduling component 310) based on at least one of a previous data server scanning or a schedule data server scanning wherein the scanning schedule reduces independent scanning activity within the data server.

At 508, a data server can be scanned (e.g., by a scanning component 230) for the set of unknown metadata associated with at least one of a set of objects, files or a set of data blocks based on the scanning schedule. At 510, the set of unknown metadata can be generated (e.g., by a scanning component 230) based on the scanning. At 512, a set of responsive metadata can be generated (e.g., by metadata collection optimization component 240) based on the set of schedule generated metadata and the set of unknown metadata. At 514, the set of responsive metadata can be sent (e.g., by output component 250).

Figure 6:
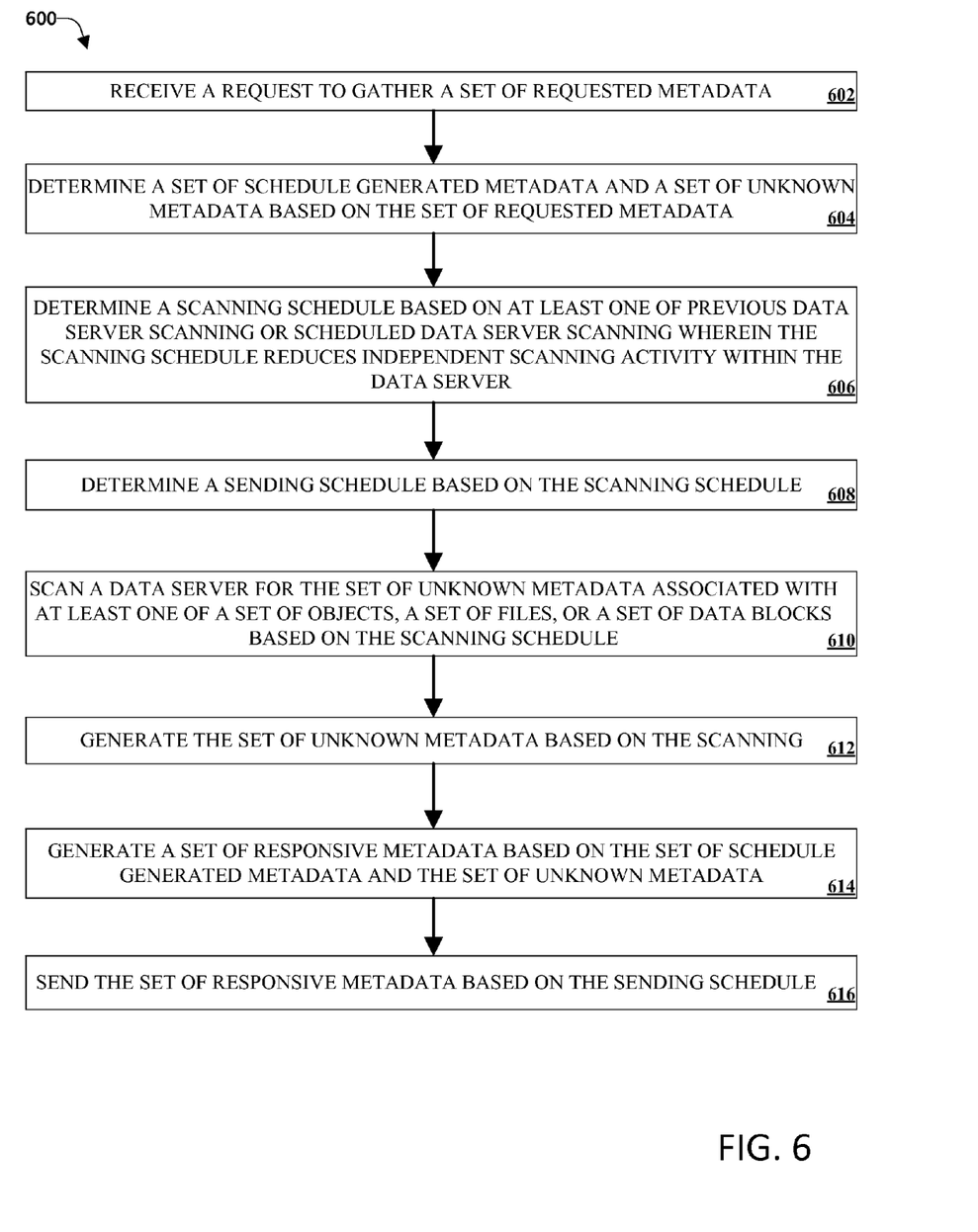
FIG. 6 illustrates an example method for augmenting metadata collection including determining a sending schedule in accordance with implementations of this disclosure.

FIG. 6 illustrates an example method for augmenting metadata collection including determining a sending schedule in accordance with implementations of this disclosure. At 602, a request to gather a set of requested metadata can be received (e.g., by a receiving component 210). At 604, a set of schedule generated metadata and a set of unknown metadata can be determined (e.g., by a metadata identification component 220) based on the set of requested metadata. At 606, a scanning schedule can be determined (e.g., by a scheduling component 310) based on at least one of a previous data server scanning or a schedule data server scanning wherein the scanning schedule reduces independent scanning activity within the data server. At 608, a sending schedule can be determined (e.g., by a scheduling component 310) based on the scanning schedule.

At 610, a data server can be scanned (e.g., by a scanning component 230) for the set of unknown metadata associated with at least one of a set of objects, files or a set of data blocks based on the scanning schedule. At 612, the set of unknown metadata can be generated (e.g., by a scanning component 230) based on the scanning. At 614, a set of responsive metadata can be generated (e.g., by metadata collection optimization component 240) based on the set of schedule generated metadata and the set of unknown metadata. At 616, the set of responsive metadata can be sent (e.g., by output component 250) based on the sending schedule.

Figure 7:
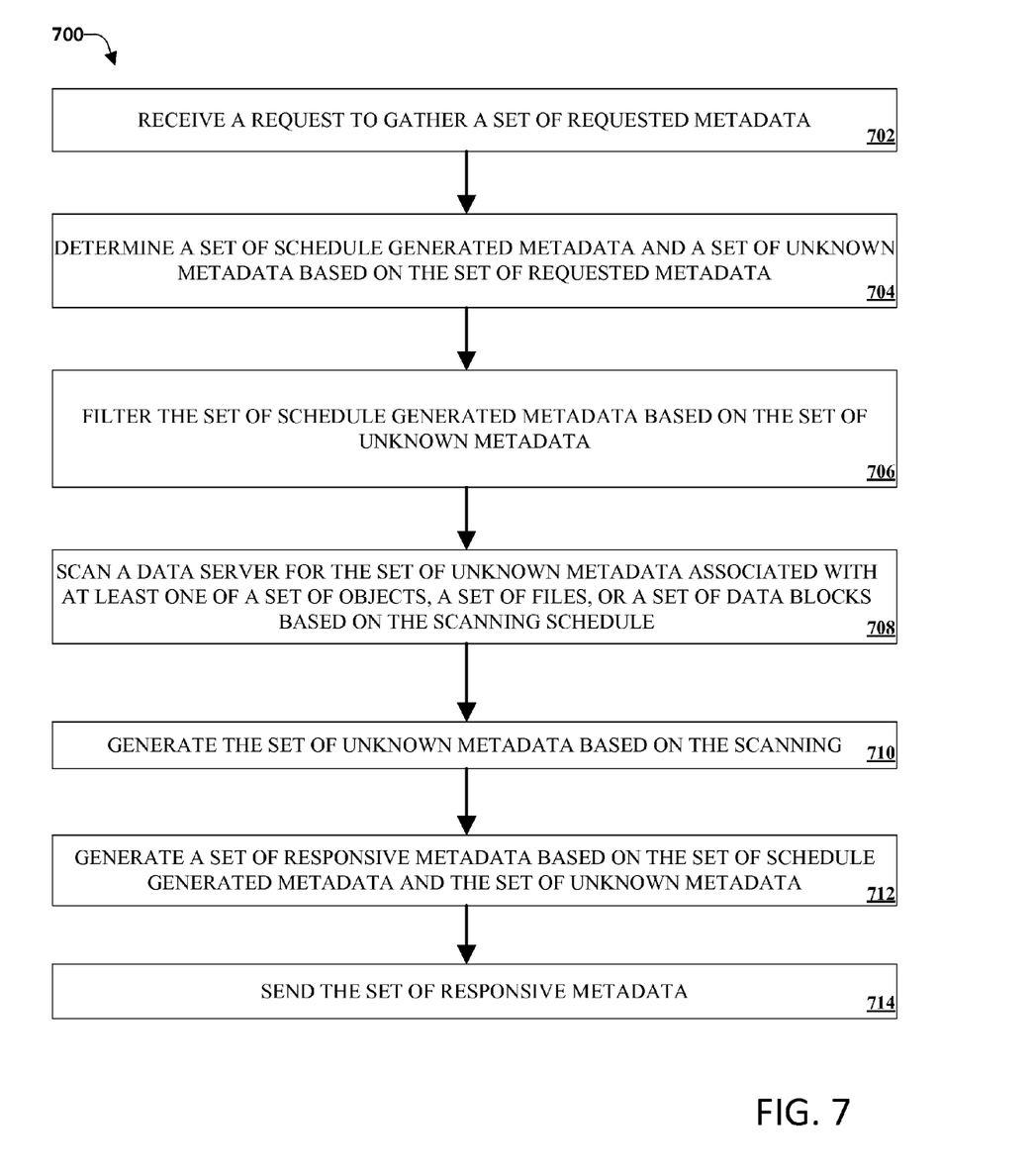
FIG. 7 illustrates an example method for augmenting metadata collection including filtering metadata in accordance with implementations of this disclosure.

FIG. 7 illustrates an example method for augmenting metadata collection including filtering metadata in accordance with implementations of this disclosure. At 402, a request to gather a set of requested metadata can be received (e.g., by a receiving component 210). At 404, a set of schedule generated metadata and a set of unknown metadata can be determined (e.g., by a metadata identification component 220) based on the set of requested metadata. In one implementation, the set of unknown metadata can include data activity metadata. In one implementation, the data activity metadata includes at least a last modified date and an activity over time metric. In one implementation, the set of unknown metadata can include stub object metadata. In one implementation, stub object metadata can include at least one of stub object data location, stub object authentication data, stub object data fingerprints, stub object data size. In one implementation, the set of unknown metadata includes lock data.

At 706, the set of schedule generated metadata can be filtered (e.g., by a metadata collection optimization component 240) based on the set of unknown metadata. In one implementation, the filtering the set of schedule generated metadata is based on the data activity metadata. At 708, a data server can be scanned (e.g., by a scanning component 230) for the set of unknown metadata associated with at least one of a set of objects, files or a set of data blocks. At 710, the set of unknown metadata can be generated (e.g., by a scanning component 230) based on the scanning. At 712, a set of responsive metadata can be generated (e.g., by metadata collection optimization component 240) based on the set of schedule generated metadata and the set of unknown metadata. At 714, the set of responsive metadata can be sent (e.g., by output component 250).

Figure 8:
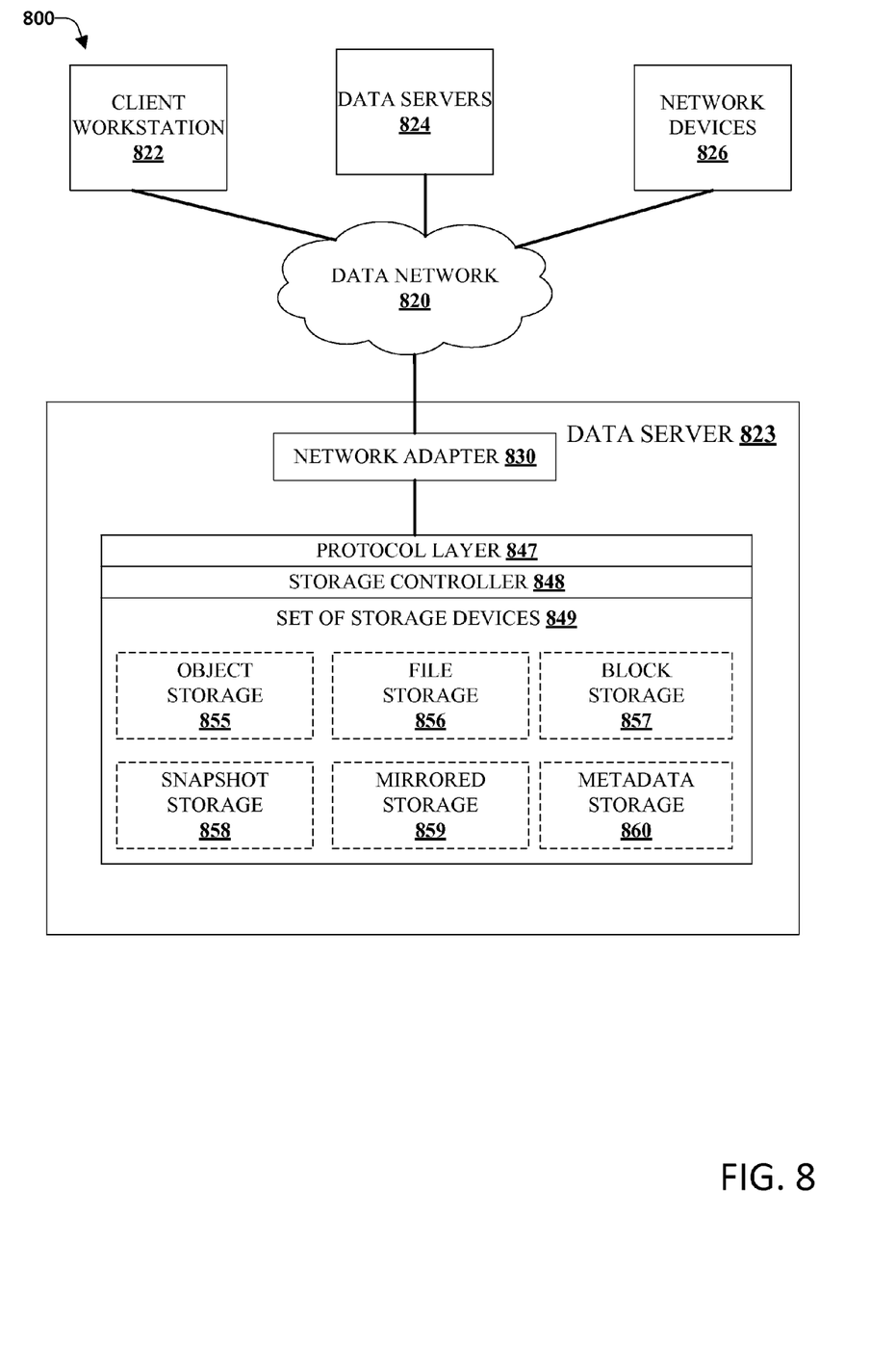
FIG. 8 illustrates an example block diagram representing a networked data server in accordance with some implementations of this disclosure.

Referring now to FIG. 8, there is illustrated an example block diagram representing a data server, a data network, and associated network devices in accordance with implementations of this disclosure. The data storage system 800 includes a data network 820 interconnecting client workstation 822, data servers 824, network devices 826 and a data storage system such as a data server 823 (also referred to simply as "data server"). The data network 820 may include any one or more of network connection technologies, such as Ethernet, and communication protocols, such as TCP/IP. The client workstations, 822 for example, are workstations such as personal computers. The workstations are generally operated by users. Data servers 824 can resemble data server 823 but may have different component or different functionality depending on the purpose of the individual data server. Network devices 826 can include printers, desktop computers, laptop computers, tablets, e-readers, security cameras, electronic sensors, etc. Client workstations 822, data servers 824, and network devices 826 may access the network data server 823, for example, in performing input/output (I/O) operations, data requests, and other operations.

Various aspects of the network data server 823 are further described in Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, Jiang et al., U.S. Patent Application Publication 2005/0240628, published Oct. 27, 2005, incorporated herein by reference, and Jiang et al., U.S. Patent Application Publication 2004/0059822-A1 published Mar. 25, 2004, incorporated herein by reference.

Network adapter 830 provides for communication of data packets over the data network 820 via a data transmission protocol such as TCP/IP. Data server 823 can be programmed with a protocol layer 847 capable of supporting a variety of network protocols including Network File System (NFS) protocols for supporting communication with network clients over the data network 820 using the NFS file access protocol, and Common Internet File System (CIFS) protocols 842 for supporting communication with network clients over the data network using the CIFS file access protocol.

Storage controller 848 can store data into and out from the set of storage drives 849. The set of storage devices 849 can include drives for object storage 855, file storage 856, block storage 857, snapshot storage 858, mirrored storage 859, and/or metadata storage 860. It can be appreciated that storage controller 848 can make the appropriate object based, file based, or block based calls to object storage 855, file storage 856, and block storage 857. It can be further appreciated that data server 823 as depicted includes unified storage for object storage, file storage, and block storage; however, implementations can also include data servers that contain just object storage, just file storage, just block storage, or any combination thereof.

Snapshot storage 858 can store data related to snapshots of the set of storage devices 849. For example, a snapshot can retain data related to a set of files, a set of directories, associated metadata, etc. at a specific moment in time. Mirrored storage 859 can retain mirrored or duplicated instances of files, objects, or blocks. For example, in the case of hardware failure, mirrored storage 859, containing up to date copies of data stored within the hardware that has failed, can act as an immediate access point to any files, objects, or blocks inaccessible due to the failed hardware. Metadata storage 860 can retain metadata related to object storage 855, file storage 856, block storage 857, snapshot storage 858, mirrored storage, 859, etc. Metadata storage 860 can also retain data associated with metadata scanning activity including past scanning activity, current scanning activity, scheduled future scanning activity, etc.

The data network 820 may be any one or more of a variety of networks or other type of communication connections as known to those skilled in the art. For example, the data network 820 may be the Internet, an intranet, network or other wireless or other hardwired connection(s) by which the client workstations 822, data servers 824, and network devices 826 may access and communicate with the network data server 823, and may also communicate with other components (not shown) that may be included in the network data server 823. Each of client workstations 822, data servers 824, network devices 826 and the network data server 823 may be connected to the data network 820 by any one of a variety of connections as may be provided and supported in accordance with the type of data network 820.

The processors included in the client workstations 822, data servers 824, network devices 826 and data server 823 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the network data server 823 are described herein in more detail, and may vary with each particular implementation. Each of the client workstations 822, data servers 824, network devices 826 and the network data server 823 may all be located at the same physical site, or, alternatively, may also be located in different physical locations. Some or all of the connections by which the client workstations 822, data servers 824, network devices 826, and the network data server 823 may be connected may pass through other communication devices, such switching equipment that may exist such as a phone line, a repeater, a multiplexer or even a satellite.

Each of the client workstations 822, data servers 824, and network devices 826 may perform different types of data operations in accordance with different types of tasks. Any one of the client workstations 822, data servers 824, and network devices 826 may issue a data request to the network data server 823 to perform a data operation. For example, an application executing on one of the client workstations 822 may perform a read or write operation resulting in one or more data requests to the network data server 823.

An implementation of the data storage system 800 may include one or more network data servers 824. Each of the network data servers 824 may include one or more data storage devices, such as disks. Each of the network data servers 824 included in data storage system 800 may be inter-connected. Additionally, the network data servers 824 may also be connected to the clients through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the clients, for example, to the network data server 823.

It should be noted that each of the network data servers 824, 823, etc. may operate stand-alone, or may also be included as part of a storage area network (SAN) that includes, for example, other components such as other network data servers.

Each of the network data servers of element 800 may include a plurality of disk devices or volumes. The particular network data server and examples as described herein for purposes of illustration should not be construed as a limitation. Other types of commercially available data storage systems, as well as processors and hardware controlling access to these particular devices, may also be included in an embodiment.

Client workstations 822, data servers 824, and network devices 826, provide data and access control information through channels to the storage systems, and the storage systems may also provide data to the clients also through the channels. The clients do not address the disk drives of the storage systems directly, but rather access to data may be provided to one or more clients from what the clients view as a plurality of file systems. A file system is created from a logical device or logical volume. The logical volume may or may not correspond to an actual disk drive. For example, one or more logical volumes may reside on a single physical disk drive. Data in a single storage system may be accessed by multiple clients allowing the clients to share the data residing therein. A LUN (logical unit number) may be used to refer to one of the foregoing logically defined devices or volumes.

In an implementation in which data storage system 800 of FIG. 8 is implemented using one or more data storage systems, each of the data storage systems may include code thereon for performing the techniques as described herein. In following paragraphs, reference may be made to a particular implementation such as, for example, an implementation in which data storage system 800 of FIG. 8 includes a single data storage system, multiple data storage systems, a data storage system having multiple data processors, and the like. However, it will be appreciated by those skilled in the art that this is for purposes of illustration and should not be construed as a limitation of the techniques herein. As will be appreciated by those skilled in the art, the network data server 823 may also include other components than as described for purposes of illustrating the techniques herein.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
   receiving a request to gather a set of requested metadata;
   determining a set of schedule generated metadata and a set of unknown metadata based on the set of requested metadata wherein the set of schedule generated metadata is determined by examining a metadata log that contains types of metadata that are gathered on a recurring basis and wherein the set of unknown metadata is of a type not contained in the metadata log;
   scanning a data server for the set of unknown metadata associated with at least one of a set of objects or a set of files or a set of data blocks within the data server;
   generating the set of unknown metadata based on the scanning;
   generating a set of responsive metadata based on the set of schedule generated metadata and the set of unknown metadata; and
   sending the set of responsive metadata.

2. The method of claim 1, further comprising generating the set of responsive metadata without regenerating the set of schedule generated metadata.

3. The method of claim 1, further comprising:
   determining a scanning schedule based on at least one of previous data server scanning or scheduled data server scanning wherein the scanning scheduling reduces independent scanning activity within the data server and wherein scanning the data servers is based on the scanning schedule.

4. The method of claim 3, further comprising:
   determining a sending schedule based on the scanning schedule wherein the sending the set of responsive metadata is based on the sending schedule.

5. The method of claim 1, further comprising:
   filtering the set of schedule generated metadata based on the set of unknown metadata.

6. The method of claim 5, wherein the set of unknown metadata includes data activity metadata and wherein the filtering the set of schedule generated metadata is based on the data activity metadata.

7. The method of claim 6, wherein the data activity metadata includes at least a last modified date and an activity over time metric.

8. The method of claim 1, wherein the set of unknown metadata includes stub object metadata.

9. The method of claim 8, wherein stub object metadata includes at least one of stub object data location, stub object authentication data, stub object data fingerprints, stub object data size.

10. The method of claim 1, wherein the set of unknown metadata includes lock data.

11. A system comprising:
    a memory that has stored thereon computer executable components; and
    a processor that executes the following computer executable components stored in the memory:
       a receiving component that receives a request to gather a set of requested metadata from a network device;
       a metadata identification component that determines a set of schedule generated metadata and a set of unknown metadata based on the set of requested metadata wherein the set of schedule generated metadata is determined by examining a metadata log that contains types of metadata that are gathered on a recurring basis and wherein the set of unknown metadata is of a type not contained in the metadata log;
       a scanning component that scans a data server for the set of unknown metadata associated with at least one of a set of objects or set of files or a set of data blocks and generates the set of unknown metadata based on the scanning;
       a metadata collection optimization component that generates a set of responsive metadata based on the generated set of unknown metadata and the set of schedule generated metadata; and
       an output component that sends the set of responsive metadata to the network device.

12. The system of claim 11, wherein the metadata identification component determines the set of schedule generated metadata based on a set of metadata collection history.

13. The system of claim 12, further comprising:
    a scheduling component that generates a scanning schedule based on the set of metadata collection history wherein the scanning component scans the data server based on the scanning schedule.

14. The system of claim 13, wherein the scheduling component generates the scanning schedule based on minimizing independent metadata scans.

15. A computer readable medium with program instructions stored thereon to perform the following acts:
    receiving a request to gather a set of requested metadata;
    determining a set of schedule generated metadata and a set of unknown metadata based on the set of requested metadata wherein the set of schedule generated metadata is determined by examining a metadata log that contains types of metadata that are gathered on a recurring basis and wherein the set of unknown metadata is of a type not contained in the metadata log;
    scanning a data server for the set of unknown metadata associated with at least one of a set of objects or set of files or a set of data blocks within the data server;
    generating the set of unknown metadata based on the scanning;
    generating a set of responsive metadata based on the set of schedule generated metadata and the set of unknown metadata; and
    sending the set of responsive metadata.

16. The computer readable medium of claim 15, further comprising:
scheduling the scanning the data server based on at least one of previous data server scanning or scheduled data server scanning wherein the scheduling reduces independent scanning activity within the data server.

17. The computer readable medium of claim 16, further comprising:
scheduling the sending the set of responsive metadata based on the scheduling the scanning.

18. The computer readable medium of claim 15, further comprising:
filtering the set of schedule generated metadata based on the set of unknown metadata.

19. The computer readable medium of claim 18, wherein the set of unknown metadata includes data activity metadata and wherein the filtering the set of schedule generated metadata based on the data activity metadata.

20. The computer readable medium of claim 19, wherein the data activity metadata includes at least a last modified date and an activity over time metric.

\* \* \* \* \*